United States Patent [19]

Carpenter et al.

[11] Patent Number: 4,880,645

[45] Date of Patent: Nov. 14, 1989

[54] COATING CEREAL WITH FRUIT JUICE

[75] Inventors: Thomas L. Carpenter, Shamong, N.J.; William Fisher, Elkorn, Nebr.; Thomas A. Smith, Battle Creek, Mich.

[73] Assignee: General Foods Corp., White Plains, N.Y.

[21] Appl. No.: 97,221

[22] Filed: Sep. 14, 1987

[51] Int. Cl.$^4$ ............................ A23L 1/64; A23P 1/08
[52] U.S. Cl. ........................................ 426/89; 426/93; 426/96; 426/103; 426/307
[58] Field of Search ................... 426/89, 93, 102, 103, 426/96, 307

[56] References Cited

U.S. PATENT DOCUMENTS

| | | | |
|---|---|---|---|
| 1,510,679 | 10/1924 | Katzprowsky | 426/102 |
| 2,196,395 | 4/1940 | Kellog | 426/93 |
| 2,868,647 | 1/1959 | Vollink | 426/302 |
| 3,318,706 | 5/1967 | Fast | 426/302 |
| 3,876,811 | 4/1975 | Bonner et al. | 426/96 |
| 4,501,759 | 2/1985 | Gajewski | 426/96 |
| 4,565,702 | 1/1986 | Morley et al. | 426/93 |

FOREIGN PATENT DOCUMENTS 2527946 1/1977 Fed. Rep. of Germany ........ 426/93

Primary Examiner—Donald E. Czaja
Assistant Examiner—Helen Pratt
Attorney, Agent, or Firm—Thomas R. Savoie; D. J. Donovan

[57] ABSTRACT

The present invention teaches sweetening a comestible such as a ready-to-eat cereal with a coating comprising a sweetening syrup having from 9% to 85% by weight reducing sugars and a pectin solution. The present invention also teaches a method for sweetening a comestible with a sweetening syrup comprising forming a mixture of sweetening syrup and a pectin solution and coating said mixture onto the surface of the comestible and drying same to a desired moisture content for packaging.

25 Claims, No Drawings

COATING CEREAL WITH FRUIT JUICE

FIELD OF INVENTION

The present invention is concerned with sweetening cereal with a sweetening syrup having a high level of reducing sugar. More particularly, the present invention is concerned with a process for decreasing the clumping of cereal particles when coated with fruit juice.

BACKGROUND

Fruit juice, honey and similar sweeteners having a relatively high level of reducing sugar content, when exposed to the atmosphere will become sticky. Coating made up substantially of fruit juice concentrate tends to be hydroscopic in nature juice and absorbs water when left open to the atmosphere. This water absorption causes clumping of the cereal in as few as 4-6 hours of exposure to the atmosphere.

Attempts have been made to sweeten cereal products with more natural sweeteners such as fruit juice. However, these attempts have proven unsuccessful because of the afinity of the fruit juice coated cereal particles to stick together resulting in formation of large clumps of cereal within the boxes and the inability of the package product to flow.

It has been known to use pectin in cereal. However, its uses have been restricted to acting as a thickening agent, a stabilizer and/or to create a desirable food texture. Pectin has never been used to reduce the clumping of cereal products coated with syrups having high levels of reducing sugars.

For instance, U.S. Pat. No. 4,501,759 by Gajewski discloses a coated cereal Product which contains from 0.1% to 5% pectin in the coating. The pectin serves the purposes of maintaining aspartame in suspension, binding aspartame to the surface of the comestible, and distributing the aspartame evenly over the comestible. Further, U.S. Pat. No. 4,565,702 by Marky et al. discloses a dietary fiber composition containing low methoxy pectin as n insoluble fiber. The pectin coating serves as a non-digestable portion of the fiber which provides bulk due to its hydrophilic nature, and further it makes the dietary fiber composition organoleptically pleasing.

The incorporation of low methoxy pectin into fruit juice concentrates as a gelling agent was also disclosed in U.S. Pat. No. 2,605,188 by Baker. These concentrates are capable of being reconstituted to produce beverages or gelled to produce jellied desserts.

The present invention solves the clumping problem associated with coating cereal with sweetening syrups having high levels of reducing sugars such as fruit juice, in a novel manner not disclosed in the prior art.

It is, therefore, an object of the present invention to produce a non-sucrose sweetened cereal.

Another object of the present invention is a process for sweetening cereal with fruit juice.

A further object of the present invention is to significantly decrease the clumping associated with fruit juice coated cereals.

SUMMARY OF THE INVENTION

The present invention is concerned with a sweetened dry comestible consisting essentially of a dry comestible said dry comestible having a coating comprising a combination of a sweetening syrup having from 9% to 85% by weight reducing sugars and a pectin solution wherein said combination is coated onto the comestible in amounts sufficent to impart a sweetness level and flavor profile similar to a sucrose-coated comestible wherein said sweetened, dry comestible does not stick or clump together with other sweetened dry comestibles.

Further, the present invention is concerned with a process for sweetening the dry comestible comprising the steps of: preparing a mixture comprising a combination of a 2% to 7% pectin solution in water, and a sweetening syrup having from 9% to 85% by weight reducing sugars; preheating the mixture prior to coating to a temperature ranging from 165° F. to 185° F.; coating the comestible with the preheated solution in amounts ranging from 2% to 45% on a dry weight basis; and drying the coated comestible to a moisture content ranging from 0.75 to 20.0% by weight.

DETAILED DESCRIPTION OF THE INVENTION

The present invention relates to comestibles such as ready-to-eat cereals, having an outer coating made up of sweetening syrup containing added pectin. Another essential feature of the present invention is a method for coating said ready-to-eat cereal with said pectinated sweetening syrup.

In order to alleviate the clumping problem associated with the use of sweetening syrups having high levels of reducing sugar as a coating for comestibles such as ready-to-eat cereal, it was discovered that the addition of pectin to said syrup prior to coating same onto a comestible or the spraying of a pectin solution onto the syrup coated comestible in a separate step significantly reduces clumping in the finished product over extended period of storage time.

Pectin substances are a group of heterogenous polysaccharides with a high molecular weight and whose predominant structural subunit is D-galacturonic acid. Pectin substances are found in the intercellular regions of the cell walls of high plants such as tomatoes, apples, apple pomace, citrus and the like, with the amount of pectin present varying with the plant variety.

Commercial pectins are available in two forms, high methoxy and low methoxy. High methoxy pectin requires 55-85% sugar and a pH of about 2.5-3.8 in order to form a gel thereby restricting its use to sweetened fruit products, while low methoxy pectin reguires no sugar or acid for gelation and is therefore used as a gelling agent especially in fruit products with a low sugar content or in product containing no added sugar. The pectin used in the present invention is produced by Atlantic Gelatin under the tradename Sure-Jell (72.0–74.0 DM).

The preferred pectin in the present invention is a high methoxy pectin because of the properties disclosed above. The pectin is first dissolved in water to form a solution. The agueous solution should generally contain from about 2% to about 7% high methoxy pectin and preferably from about 3.5% to 5.5%. In instances where a solution of pectin is dissolved in water and sprayed onto a syrup coated comestible, the amount of pectin in the solution should generally range from about 3.5% to about 5.5%.

In order to get the requisite sweetness i.e. a sweetness level similar to conventional sweetened comestible, the sweetening syrup is sprayed on in a concentrated form.

However, regular sweetening syrup may be sprayed on, but this would increase the drying time. Generally, sweetening syrups which contain high levels of reducing sugars are more suitable. Suitable sweetening syrups may have levels of reducing sugars from 9% to 85% by weight and preferably from 50% to 80%. The sweetening syrup may be a member selected from a group comprising fruit juice, honey, corn syrup, brown sugar, invert sugar and combinations thereof. It is preferred, however, that the sweetening syrup be a fruit juice and more preferably, a fruit juice concentrate.

The preferred fruit juice may be a member selected from a group comprising apple juice, pear juice, grape juice, orange juice, peach juice, banana juice, grapefruit juice, strawberry juice and combinations thereof. The most preferred fruit juice is a blend of apple juice, pear juice, peach juice and strawberry juice.

The sweetening syrup sprayed onto the comestible should have a soluble solid level ranging from 65° Brix to 75° Brix and preferably from 69° Brix to 71° Brix. The pectin containing sweetening syrup is coated onto the comestible in amounts ranging from about 2% to about 45% and preferably from about 7% to about 18% or a dry weight basis.

Though most fruit juices contain pectin, the effect of the indigenous pectin contained therein on the functionality of the coated comestible is negligable and as a result the affirmity of the coated comestible to clump will continue to be a problem.

In the present invention the pectin is first blended with sufficient water to make a 2% to 7% solution. The pectin solution is then combined with the sweetening syrup at a sweetening syrup to pectin ratio of from 20:1 to 25:1 and preferably about 22:1. The pectin, sweetening syrup mixture is then coated on the comestible. The coating of pectin and sweetening syrup onto a comestible may also be accomplished in two separate steps. First, the fruit juice concentrate is applied by spraying followed by the coating of a 3.5% to 5.5% pectin solution onto the syrup coated comestible.

The coating of the pectin containing sweetening syrup onto the comestible is accomplished by first heating the sweetening syrup to a temperature ranging from 165° F. to 175° F. followed by spraying same onto the surface of the comestible by conventional means, such as tumbling in a drum to achieve uniform distribution or by merely spraying the comestible with the sweetening syrup. The purpose for heating the sweetening syrup is to decrease the viscosity of the syrup, particularly in the case of a syrup concentrate where spraying can be problematic.

The amount of the pectin containing sweetening syrup coated onto the comestible can vary. However, good results are obtained when the amount of the pectin containing sweetening syrup ranges from about 2% to about 45% and preferably from 7% to 18%.

The desired comestible to be coated can vary widely. For instance, gum pieces, donuts, raisins, dates, peaches, apricots, pineapples and the like may be suitable. The present invention is particularly concerned with pre-sweetened ready-to-eat (RTE) cereal. Cereal particles such as flaked, shredded, expanded, or other forms, such as corn flakes, bran flakes, extruded breakfast cereal, puffed cereals and the like may be coated according to the present invention. Such cereal particles are prepared in the usual manner and may either be toasted or untoasted.

The coated comestible is then dried to a moisture content of about 0.75%, to 20% and in the case of RTE cereal about 1% to 5% by weight to form the coated comestible of the present invention sweetened with fruit juice. Any conventional method of drying and equipment can be used to dry the coated comestible pieces. Drying can be accomplished using such equipment as rotary bed, tray and belt dryers. The preferred drying technique is forced hot air convection drying.

The finished coated comestible has a sweetness profile similar to sucrose sweetened comestible.

The following example is given to further illustrate the present invention but not to limit the invention in any way whatsoever.

EXAMPLE I

The following ingredients were weighed and placed in separate containers.

| A. | Flakes | 177 parts |
|---|---|---|
| B. | Mixed Fruit Juice Concentrate DDR, 1FC3 from GAMA FOODS | 22 parts |
| C. | Pectin: Sure-Jel ATLANTIC GELATIN | 1 part |

The corn flakes were preheated to 220° F. for two minutes then placed in a coating reel. The pectin was first blended with sufficient water to make a 3% solution. The pectin solution was then added to the fruit juice concentrate and mixed thoroughly. The mixture was then preheated to 170° F. and subsequently sprayed onto the preheated corn flakes in the coating reel.

The coated flakes were then conveyed to a dryer and dried at 220° F. for 25 minutes to a moisture of about 2% then packaged for distribution.

The finished product had a flavor and sweetness profile similar to sucrose coated cereal. When placed in an unsealed carton and stored at ambient temperature (73° F., 50% RH,) the coated cereal showed no signs of clumping at 5 days.

EXAMPLE II

The following ingredients were weighed and placed in separate containers.

| A. | Corn Flakes | 177 parts |
|---|---|---|
| B. | Mixed fruit juice concentrate | 22 parts |
| C. | Pectin | 1 part |

The corn flakes were preheated to 220° F. for 2 minutes then placed in a coating reel. The fruit juice concentrate was preheated to 170° F. and subsequently sprayed onto the preheated corn flakes in the coating reel.

The pectin was blended with sufficient water to make a 3% solution, then preheated to 170° F. and sprayed onto the fruit juice concentrate coated corn flakes.

The coated flakes were then conveyed to a dryer and dried at 220° F. for 25 minutes to a moisture of about 2% then packaged for distribution.

The finished product, when placed in an unsealed carton and stored at ambient temperature, showed no signs of clumping at 5 days.

What is claimed is:

1. A sweetened, dry comestible consisting essentially of a dry comestible, said dry comestible having a coating comprising a combination of a sweetening syrup having from 9% to 85% by weight reducing sugars and a pectin solution and wherein the ratio of sweetening syrup to pectin ranges from 20:1 to 25:1 and preferably 22:1, said combination is coated on to the comestible in amounts sufficient to impart a sweetness level and flavor profile similar to a sucrose-coated comestible wherein said sweetened, dry comestible does not stick or clump together with other sweetened, dry comestible.

2. The comestible of claim 1 wherein the comestible is a member selected from the group consisting of a ready-to-eat cereal, raisins, dates, peaches, apricots, pineapples and combinations thereof.

3. The comestible of claim 2 wherein the comestible is a ready-to-eat cereal.

4. The comestible of claim 3, wherein the ratio of sweetening syrup to pectin is 22:1.

5. The comestible according to claim 1 wherein the amount of coating, coated onto comestible ranges from 2% to 45% on a dry weight basis.

6. The of claim 5 wherein the amount of coating coated onto the comestible ranges from 7% to 18% on a dry weight basis.

7. The comestible of claim 1 wherein the sweetening syrup is a member selected from the group consisting of fruit juice, honey, corn syrup, brown sugar, invert sugar and combinations thereof.

8. The comestible of claim 7 wherein the sweetening syrup is fruit juice.

9. The comestible of claim 8 wherein the fruit juice is a member selected from the group consisting of apple juice, pear juice, grapefruit juice, strawberry juice and combinations thereof.

10. The comestible of claim 8 wherein the fruit juice is a combination of apple juice, pear juice, peach juice and strawberry juice.

11. The comestible of claim 8 wherein the fruit juice is a concentrated fruit juice.

12. The comestible of claim 1 wherein the level of reducing sugar in the sweetening syrup ranges from 50% to 80% by weight.

13. A process for sweetening a dry comestible comprising the steps of:
 (a) preparing a mixture comprising a combination of:
  (1) a 2% to 7%,pectin solution in water, and
  (2) a sweetening syrup having from 9% to 85% by weight reducing sugars wherein the ratio of sweetening syrup to pectin ranges from 20:1 to 25.1 and preferably 22:1,
 (b) preheating the mixture prior to coating to a temperature ranging from 165° F. to 185° F.;
 (c) coating the comestible with the preheated solution in amounts ranging from 2% to 45% on a dry weight basis; and
 (d) drying the coated comestible to a moisture content ranging from 0.75% to 20.0% by weight.

14. A process according to claim 13 wherein the comestible is a member selected from the group consisting of a ready-to-eat cereal, raisins, dates, peaches, apricots, pineapples and combinations thereof.

15. A process according to claim 14 wherein the comestible is a ready-to-eat cereal.

16. A process according to claim 13 wherein the pectin in the pectin solution, ranges from 4.5% to 5.5%.

17. A process according to claim 14 wherein the ratio of sweetening syrup to pectin is 22:1.

18. A process according to claim 13 wherein the amount of coating coated onto the comestible ranges from 7% to 18% on a dry weight basis.

19. A process according to claim 13 wherein the sweetening syrup is a member selected from a group comprising fruit juice, honey, corn syrup, brown sugar, invert sugar and combinations thereof.

20. A process of claim 13 wherein the sweetening syrup is fruit juice.

21. A process of claim 20 wherein the fruit juice is a member selected from the group consisting of apple juice, pear juice, grapefruit juice, orange juice, peach juice, banana juice, grape juice, strawberry juice and combinations thereof.

22. A process according to claim 21 wherein the fruit juice is a combination of apple juice, pear juice, peach juice and strawberry juice.

23. A process according to claim 13 wherein the fruit juice is a concentrated fruit juice.

24. A process according to claim 13 wherein the pectin is a high methoxy pectin.

25. A process according to claim 13 wherein the level of reducing sugar in the sweetening syrup ranges from 50% to 80% by weight.

* * * * *